(12) United States Patent
Troya et al.

(10) Patent No.: US 7,583,770 B2
(45) Date of Patent: Sep. 1, 2009

(54) MULTIPLEX SIGNAL ERROR CORRECTION METHOD AND DEVICE

(75) Inventors: Alfonso Troya, Berlin (DE); Milos Krstic, Frankfurt (DE); Koushik Maharatna, Bristol (GB)

(73) Assignee: IHP GmbH-Innovations For High Performance Microelectronics/Institut fur Innovative Mikroelektronik, Frankfurt (DE)

( * ) Notice: Subject to any disclaimer, the term of this patent is extended or adjusted under 35 U.S.C. 154(b) by 518 days.

(21) Appl. No.: 10/530,595

(22) PCT Filed: Oct. 9, 2003

(86) PCT No.: PCT/EP03/11193

§ 371 (c)(1),
(2), (4) Date: Jul. 28, 2005

(87) PCT Pub. No.: WO2004/036863

PCT Pub. Date: Apr. 29, 2004

(65) Prior Publication Data

US 2006/0165187 A1    Jul. 27, 2006

(30) Foreign Application Priority Data

Oct. 11, 2002  (DE) ................................. 102 48 507

(51) Int. Cl.
*H04L 7/00* (2006.01)
(52) U.S. Cl. ...................... 375/355; 375/371; 375/260; 375/344; 375/233
(58) Field of Classification Search ................. 375/355, 375/344, 233, 260, 371
See application file for complete search history.

(56) References Cited

U.S. PATENT DOCUMENTS 4,648,100 A    3/1987   Mardirosian (Continued)

FOREIGN PATENT DOCUMENTS

EP    0 838 928    4/1998

(Continued)

OTHER PUBLICATIONS

IEEE Std 802.11a-1999, supplement to IEEE standard for information technology, "Part 11: Wireless LAN medium access control (MAC) and physical layer (PHY) specifications—High speed physical layer in the 5 GHz band," XP-002269120, IEEE 1999.

(Continued)

*Primary Examiner*—Sudhanshu C Pathak
(74) *Attorney, Agent, or Firm*—Ware, Fressola, Van Der Sluys & Adolphson LLP (57) ABSTRACT

A method of reducing a phase error caused by a plurality of error sources in a signal in the form of a sequence of a plurality of digital partial signals associated with a number of subcarriers (k) of a carrier, the method including, for each partial signal: equalization of the partial signal (Y(i,k)), estimation of the phase error of the equalized partial signal (X(i,k)), and correction of the estimated phase error of the equalized partial signal. One embodiment provides the equalization with elimination of an accumulation of a phase error over the sequence of the partial signals. In addition the estimation includes detecting a plurality of predetermined pilot signals and determining a phase correction factor on the basis of the detected pilot signals, with at least one multiplication operation carried out solely by means of shift and adding operations. A corresponding apparatus is also described.

15 Claims, 5 Drawing Sheets

U.S. PATENT DOCUMENTS

| | | | |
|---|---|---|---|
| 5,912,876 | A | 6/1999 | H'mimy |
| 5,940,450 | A * | 8/1999 | Koslov et al. ............... 375/344 |
| 6,310,926 | B1 * | 10/2001 | Tore ........................... 375/355 |
| 6,370,188 | B1 | 4/2002 | Wu et al. |
| 6,393,083 | B1 * | 5/2002 | Beukema ................... 375/371 |
| 6,438,173 | B1 | 8/2002 | Stantchev |
| 6,656,852 | B2 | 12/2003 | Rotondaro et al. |
| 6,798,832 | B1 * | 9/2004 | Nakata et al. ............... 375/233 |
| 7,020,225 | B2 * | 3/2006 | Sindhushayana et al. .... 375/344 |
| 2002/0014597 | A1 | 2/2002 | Koh et al. |
| 2003/0119291 | A1 | 6/2003 | Ahn et al. |
| 2003/0185147 | A1 | 10/2003 | Taga et al. |
| 2003/0228747 | A1 | 12/2003 | Ahn et al. |
| 2004/0120412 | A1 * | 6/2004 | Banerjea ..................... 375/260 |

FOREIGN PATENT DOCUMENTS

| | | |
|---|---|---|
| WO | WO 97/41672 | 11/1997 |
| WO | WO 99/56424 | 11/1999 |
| WO | WO 01/20863 | 3/2001 |

OTHER PUBLICATIONS

M. Krstic et al., "Implementation of an IEEE 802.11a compliant low-power baseband processor," *Telsiks 2003*, Serbia and Montenegro, Nis, Oct. 1-3, 2003, XP-002269119, pp. 97-100.

V. Mignone et al., "CD3-OFDM: A novel demodulation scheme for fixed and mobile receivers," *IEEE Transactions on Communications*, vol. 44, No. 9, Sep. 1996, pp. 1144-1151.

P. Robertson et al., "Analysis of the effects of phase-noise in orthogonal frequency division multiplex (OFDM) systems," IEEE 1995, pp. 1652-1657.

M. Speth et al., "Optimum receiver design for wireless broad-band systems using OFDM—Part I," *IEEE Transactions on Communications*, vol. 47, No. 11, Nov. 1999, pp. 1668-1677.

Springer; U. Tietze et al.; "Halbleiter-Schaltungstechnik;" pp. 680-681, sections 8.7, 8.7.1; 2002.

Statement of relevance for "Halbleiter-Schaltungstechnik".

\* cited by examiner

MULTIPLEX SIGNAL ERROR CORRECTION METHOD AND DEVICE

CROSS REFERENCE TO RELATED APPLICATIONS

This application is for entry into the U.S. national phase under §371 for International Application PCT/EP03/11193 having an international filing date of Oct. 9, 2003, and from which priority is claimed under all applicable sections of Title 35 of the United States Code including, but not limited to, Sections 120, 363 and 365(c), and which in turn claims priority under 35 USC §119 to German Patent Application No. 102 48 507.0-42 filed on Oct. 11, 2002.

TECHNICAL FIELD

Reducing errors in telecommunications, and more particularly in OFDM type telecommunication signals.

BACKGROUND ART

The multi-carrier method OFDM (orthogonal frequency division multiplex) is becoming more widespread as time goes by. It is used for digital radio (digital audio broadcasting or DAB), digital television (digital video broadcasting or DVB) and for local radio networks (high performance local area network or Hiperlan).

OFDM differs from single-carrier methods in that the information flow is transmitted not by way of a single carrier but by way of a number of subcarriers. A frame to be transmitted is subdivided into a number of symbols. Each symbol contains a number of data which are transmitted from the transmitter to the receiver distributed to various subcarriers. A given frequency spacing is maintained between the subcarriers. The orthogonality of the subcarriers is achieved by orthogonally encoded digital modulation. The orthogonality of the subcarriers ensures distinguishability thereof even in the case of spectral overlap.

Not all subcarriers in an OFDM system contain user information. There are so-called pilot subcarriers, also referred to hereinafter as pilot channels, for the transmission of pilot symbols. The pilot symbols contain information which is known from the outset to the receiver. In the transmission of a frame a plurality of pilot signals are transmitted, which are integrated into the frame at usually regularly spaced positions.

Pilot subcarriers are basically used for channel estimation. In that case channel attenuation of the various subcarriers which are also referred to as subchannels is ascertained by means of interpolation of the received values of the pilot subcarriers. The standards "IEEE 802.11a" and "Hiperlan/2" for wireless communication in networks in the 5 GHz frequency range do not permit use of the pilot channels for channel estimation. The pilot channels are here provided in mutually different frequency ranges which involve a spacing of 4.375 MHz. Therefore, only channels with a maximum delay spread of 2/4.375 MHz=0.46 μs can be correctly estimated by interpolation of the pilot channel information. In general terms however the pilot subcarriers cannot be used in the specified standards for channel estimation.

Correct decoding of OFDM signals on the receiver end is delicately dependent on the efficiency of the synchronization unit of the receiver. The synchronization unit is responsible for the detection of incoming frames and for estimating and correcting possible frequency offsets. Frequency offsets produce errors which lead to incorrect decoding of the received signal.

WO 01/20863 A1 describes a method of and an apparatus for correction at the receiver end of a phase error of the received signal in the time domain. There is provided a phase estimation circuit having two phase locked loops. The correction of a phase error in the time domain has the disadvantage of a great delay for the signal. The use of phase locked loops for phase estimation additionally signifies a high level of circuitry complication and expenditure.

Other methods provide for phase estimation and phase correction in the frequency domain. Provided for that purpose is an FFT unit which transforms the received signal by means of a fast Fourier transform or FFT into a frequency spectrum which can be broken down according to subcarriers. In those methods a synchronization unit also decides about the start time from which the incoming signal is subjected to a FFT.

The publication V. Mignone, A. Morello: "CD3-OFDM: A Novel Demodulation Scheme for Fixed and Mobile Receivers" (IEEE Transactions on Communications, Vol. 44, No. 9, September 1996, pages 1144 to 1151) discloses a method and an apparatus in which the Fourier-transformed signal of each subcarrier is subjected to equalization prior to decoding. Equalization is effected by means of the signal received in the preceding cycle. For that purpose that signal is decoded, then recoded in a kind of feedback loop and used for channel estimation of the corresponding subcarrier. The frequency response function ascertained from the channel estimation is used for equalization of the current Fourier-transformed signal by the current signal being divided by the frequency response function ascertained from the preceding signal.

It has been found however that, after the Fourier transform and equalization in the frequency domain and decoding of the symbols phase errors are contained in the equalized signal. That gives rise to errors in the decoding operation, which can result in a data communication crashing.

Conventional methods of eliminating that residual phase shift involve correction of the phase error by means of complex multiplication with a suitable phase factor of the value 1 (phasor). Complicated circuits which are based on numerically controlled oscillators (NCO) are usual for correction of the phase error. Those circuits cause a severe delay in terms of signal decoding.

DISCLOSURE OF THE INVENTION

The technical object of the invention is to provide a fast method of reducing a phase error in a received signal, which is caused by at least one error source, and a suitably designed apparatus for carrying out the method.

That object is attained by a method of reducing a phase error caused by a plurality of error sources in a signal which is present in a digital frequency representation in the form of a sequence of a plurality of digital partial signals which are associated with a number of subcarriers (k) of a carrier, with the steps which are effected for each partial signal:
equalization of the partial signal,
estimation of the phase error of the equalized partial signal, and
correction of the estimated phase error of the equalized partial signal.

In the method according to the invention the equalization step includes a step of at least partially eliminating an accumulation of a phase error of the partial signal, caused by a sampling frequency error, over the sequence of the partial signals, such that the accumulation is negligible. The estimation step includes a step of detecting a plurality of predetermined pilot signals and a step of determining a phase correction factor on the basis of the detected pilot signals, wherein at least one multiplication operation is carried out solely by means of shift and adding operations.

BRIEF DESCRIPTION OF THE DRAWINGS

The method according to the invention is based on an analysis of the responsible error sources for the phase errors remaining after the synchronization and Fourier transform steps in an OFDM receiver. In that respect reference is firstly made hereinafter to FIG. 1 to describe the structure of a typical OFDM receiver in accordance with the state of the art. The essential sources of the remaining phase errors are then discussed with reference to FIGS. 2 and 3.

DETAILED DESCRIPTION OF THE INVENTION

Figure 1:
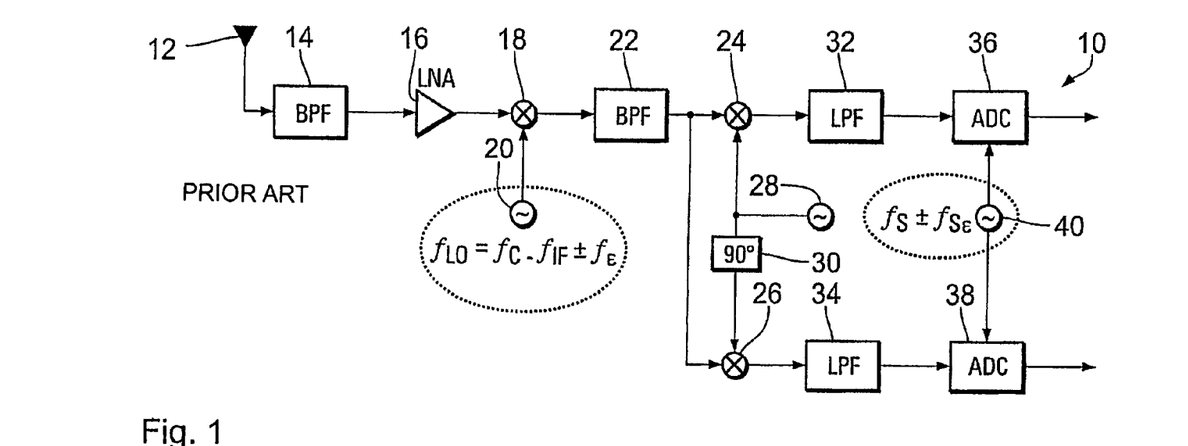
FIG. 1 shows a simplified block circuit diagram of a down-converter in accordance with the state of the art.

FIG. 1 is a simplified block circuit diagram showing a per se known OFDM receiver in the form of a heterodyne radio frequency down-converter 10, hereinafter referred to for brevity as the down-converter.

The down-converter 10 has an antenna 12. Connected downstream of the antenna is a band pass filter 14 and a low-noise pre-amplifier 16 (referred to as a low-noise amplifier or LNA).

A first mixer stage which is connected at the input side to the output of the pre-amplifier has a frequency mixer 18 and a local oscillator 20. The frequency of the oscillation produced by the local oscillator 20 is the difference of the carrier frequency $F_c$ of the oscillation received by the down-converter at its antenna and an intermediate frequency $f_{IF}$ (referred to as IF). The frequency mixer multiplies the filtered and pre-amplified signal by the frequency of the local oscillator 20. Due to tuning inaccuracies in the local oscillator 20, a frequency offset of the frequency of the local oscillator 20 of $\pm f_\epsilon$ can occur. That is considered hereinafter with reference to FIG. 2.

A channel filter 22 is connected on the output side of the local oscillator 20. The channel filter 22 is a band pass filter whose pass range is a frequency band of $\pm 10$ MHz around the intermediate frequency.

The output of the band pass filter is connected to a second mixer stage having a second and a third mixer 24 and 26 respectively, to which the output signal of the band pass filter is passed in parallel. The two mixers 24 and 26 are connected at their second input to a second local oscillator 28 which is tuned to the intermediate frequency $f_{IF}$. Provided between the output of the local oscillator 28 and the third mixer 26 is a phase shifter 30 which causes a phase shift of the oscillation of the local oscillator 20 through 90°.

The second mixer stage on the one hand provides for down-conversion of the signal, whereby the signal is freed of the frequency components of the intermediate frequency. On the other hand, the phase-shifted mixing in the parallel mixers 24 and 26 provides for separation of the real and imaginary parts of the signal, whereby it is possible to ascertain the phase position of the signal oscillation.

Low pass filters (LPA) 32 and 34 connected on the output sides of the mixers 24 and 26 provide for anti-aliasing, that is to say smoothing of the signal components. Finally there are provided analog-to-digital converters (ADC) 36 and 38 which are clocked in parallel by a sampling oscillator or sampling clock 40. The sampling frequency is $f_S$. The accuracy of the sampling frequency is $\pm f_{S\epsilon}$.

Figure 2:
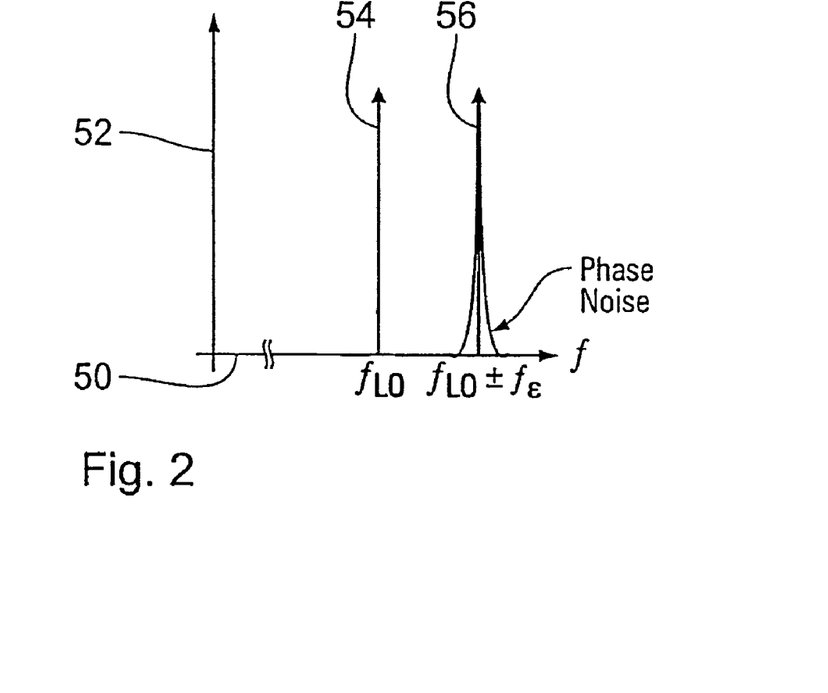
FIG. 2 shows a diagram to illustrate a frequency offset and the effect of phase noise.

FIG. 2 shows a diagram illustrating the situation of erroneous estimation of the carrier frequency and phase noise. The frequency f of the oscillation of the first local oscillator 20 is plotted on an abscissa 50. The amplitude of the oscillation is plotted on an ordinate 52. The ideal frequency spectrum of the local oscillator (LO) is represented at an abscissa position $f_{LO}$. It is in the form of a delta function, as is illustrated here in the form of an arrow 54. In other words, the ideal frequency of the local oscillator is exactly the difference of the carrier frequency $f_c$ and the intermediate frequency $f_{IF}$.

A line shape 56 whose maximum is to found on the abscissa at the position $f_{LO}+f_\epsilon$ represents the real frequency spectrum of the local oscillator 20. The maximum of the line shape 56 is shifted relative to the ideal frequency spectrum, by erroneous estimation of the carrier frequency. The line shape is further broadened by phase noise.

Figure 3:
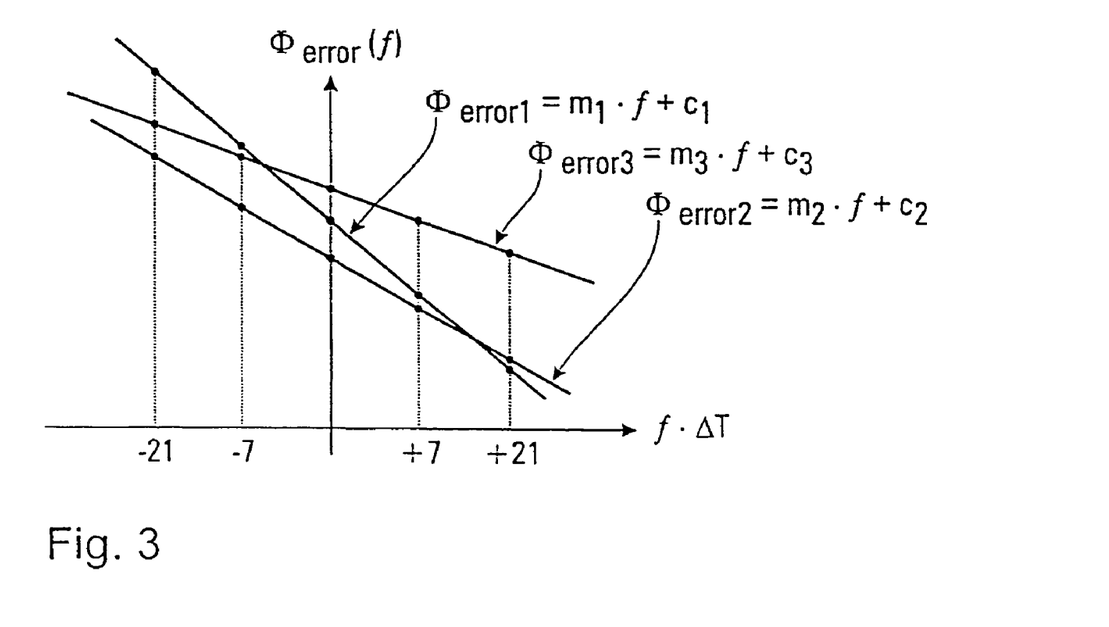
FIG. 3 shows a diagram to illustrate the accumulation of the phase error in symbols after the Fourier transform.

FIG. 3 shows by way of three symbols selected by way of example the residual phase error $\Phi_{error}$ which, subsequently to synchronization and Fourier transform of a symbol outputted by the down-converter in FIG. 1, remains in its partial signals. The diagram in FIG. 3 represents the dependency of the residual phase error on the ordinal number of the partial signals, by reference to three examples. To explain the abscissa division: each symbol of a frame is transmitted in the OFDM system in the form of partial signals on the predetermined number of subcarriers. Associated with each subcarrier i is a predetermined frequency interval with a center frequency $f_i$ which is clearly determined at a given spacing $1/\Delta T$ of the center frequencies by specifying an ordinal number i. The abscissa division in FIG. 2 is not shown exactly true to scale. In the diagram in FIG. 3 ordinal numbers from −26 to +26 correspond to a total number of 52 partial signals. The ordinal number 0 is not allocated.

The phase error can be determined on the basis of predetermination by the relevant standards only by means of predetermined pilot partial signals, referred hereinafter as pilot signals. Previously known information which is not related to the useful information is transmitted as a pilot signal. The example in FIG. 3 has four mutually spaced pilot signals distributed over a symbol. The pilot signals have in one symbol the ordinal numbers −21, −7, +7 and +21.

The underlying analysis of the present invention affords the following main error sources for phase errors in the Fourier-transformed signal:

1. Phase variations due to an erroneous estimation of the phase timings.
2. Phase variations due to an erroneous estimation of the carrier frequency.
3. Phase variations due to phase noise.
4. Phase variations due to a frequency offset of the sampling oscillator frequency during analog-to-digital conversion.

The specified sources of phase errors are described in greater detail hereinafter.

1. Erroneous Estimation of the Frame Timing

In the synchronization operation the first sample signal or sample of a frame must be estimated in regard to correct decoding of the data. In the case of sampled digital data the resolution when determining the sample is greatly dependent on the sampling interval. The sampling interval is the inverse of the sampling frequency. The timing error can be a multiple of the timing interval. The uncertainty in terms of estimation is therefore $\pm 0.5\, T_S$, wherein $T_S$ is the sampling time.

A timing error will appear on the receiver side after performing the FFT as a linear phase error. That timing error is the same for all OFDM symbols in the same frame. Therefore all symbols of a frame are influenced by a linear phase component in the same manner:

$$\Phi_{t\epsilon}(k) = \pm \pi k/N, \tag{1}$$

In that equation k denotes the frequency at the output of the FFT in the digital domain, $\Phi_{re}(k)$ denotes the phase error and N denotes the total number of the subcarriers.

2. Erroneous Estimation of the Carrier Frequency

Upon reverse conversion of the received radio frequency signals the local oscillator (LO) is not exactly tuned to the expected frequency. That frequency offset can be estimated by means of preamble symbols provided in each frame. As however that operation is performed in the digital domain the estimation is not accurate. Besides thermal noise, digital noise which adversely affects the estimation also occurs because of the limited number of bits which represent the preambled symbols and which are used for representation of the frequency offset.

The frequency offset is usually specified in standardized form with respect to the frequency spacing in the OFDM system. In the case of the above-mentioned standards the channel spacing is for example $\Delta f=312.5$ KHz. A frequency offset $f_\epsilon$ of 200 KHz is accordingly specified as a frequency offset of 0.64.

A good synchronization unit estimates the frequency offset with an error of ±0.001 (standardized). That slight residual frequency error occurs in the OFDM symbol as a constant phase after implementation of the FFT. The error accumulates from one symbol to another and therefore produces a large phase shift after a number of symbols.

3. Phase Variations Due to Phase Noise

The signal generated by the local oscillator is broadened in the frequency space due to the phase noise.

Essentially two effects are linked to the phase noise. The first is the interference between the carriers (inter-carrier interference or ICI). The second effect is what is referred to as the common phase error or CPE. ICI appears as additionally Gaussian noise. This can only be reduced by the local oscillator being designed differently. CPE produces a phase shift in the OFDM symbol after the FFT. That effect is similar to that of a frequency offset. The constant phase shift however is not accumulated here. It varies randomly from one symbol to another.

ICI and CPE both depend on the number of subcarriers which are used in the OFDM system. In the case of the ICI the power increases with the number of subcarriers. The ICI is therefore the limiting factor in systems such as DVB or DAB where thousands of subcarriers are used. In contrast thereto the CPE increases with a decreasing number of subcarriers. Therefore CPE represents the limiting factor in systems in accordance with the standard IEEE 802.11a and Hiperlan/2 where only 64 subcarriers are used. The correlation of the phase shifts over various symbols is very slight in the case of the CPE. Therefore there is no linear prediction method.

4. Phase Shifts Due to an Error in the Sampling Frequency

At the receiver input signals are sampled at a given frequency and transferred into digital signals. In a real system the actual sampling frequency does not exactly conform with the expected frequency. Rather, it will have an error $f_{S\epsilon}$ which is measured in parts per million (ppm) of the original sampling frequency. With a sampling rate of 20 MHz with a frequency error of ±20 ppm the actual sampling frequency will therefore be in the range of 20 MHz±400 Hz.

The four error sources in respect of the phase position referred to above afford a linear dependency of the phase $\phi_i(f)$ on the frequency f in the form $$\phi_i(f)=m_i f+c_i \quad (2)$$

In that equation the letter i denotes the ordinal number of a symbol, $m_i$ and $c_i$ are constants, $m_i$ being the gradient and $c_i$ being a frequency-independent phase offset.

The gradient $m_i$ is dependent on the ordinal number of the respective symbol and can be represented as:

$$m_i=m_0+i\cdot\xi \quad (3)$$

In that equation $\xi$ denotes the component which is caused by the error in respect of the sampling frequency. $\xi$ can be positive or negative, depending on whether the actual sampling frequency is greater than or less than the expected value. That error component increases with the ordinal number i of the respective symbol. It therefore accumulates from one symbol to another.

$m_0$ denotes the component which is produced by the error in the frame timing. It is the same for all symbols.

The coefficient $c_i$ can be represented as $$c_i=i\cdot c_0+\alpha_i \quad (4)$$

In that equation $\alpha_i$ is the component of the common phase error CPE for the symbol in question and $c_0$ is the phase error which is caused by the frequency offset of the carrier frequency. That error accumulates from one symbol to another.

Analysis shows that the sampling frequency error, due to the accumulation from one symbol to another, obtains a particularly great weight in the overall phase error. As it changes with each symbol, correction thereof is particularly difficult. In the method according to the invention therefore the equalization step includes a step of at least partially eliminating an accumulation of a phase error caused by a sampling frequency error in the partial signal over the sequence of the partial signals in such a way that the accumulation is negligible. The phase error caused by the sampling frequency can be disregarded by virtue of that measure in terms of correction of the remaining phase error.

In the method according to the invention the estimation step includes a step of detecting a plurality of predetermined pilot signals and a step of determining a phase correction factor on the basis of the detected pilot signals, wherein at least one multiplication operation is performed just by means of shift and adding operations.

Shift and adding operations are particularly simple operations with digital data, which can be performed at great speed. The idea of the invention of using shift and adding operations in determining the phase correction factor is closely linked in the method according to the invention to the previously stated method steps. The possibility of disregarding the phase error caused by the sampling frequency affords the prerequisite for simplifying estimation of the phase error in such a way that its mathematical calculation can be reduced at least predominantly and, in a particularly preferred embodiment described hereinafter, even completely, to the implementation of shift and adding operations, using the previously determined pilot signals.

Accordingly the method according to the invention achieves a high speed in determining the phase error, in comparison with known methods. Just the replacement of a multiplication operation by shift and adding operations affords speed advantages over known methods. In that way, the delay in the spread of the received signal, which is caused by the use of such a method, becomes particularly slight. That is of significance in particular in communication processes by way of wireless channels.

It is a basic point that the speed of the method according to the invention increases, the fewer real multiplication operations are used. Therefore, in accordance with the invention, the optimum in terms of speed is achieved if no multiplication operations are involved. When lower requirements in respect of speed are made however, it is also possible to use multiplication operations within the context of the invention.

The method according to the invention is particularly suitable for use in accordance with the standards IEEE 802.11 and Hiperlan/2. In that respect it is assumed in particular that the subcarriers are not subjected to great changes from one symbol to another, as is the case with a maximum speed of mobile transmitters and receivers of 3 m/s.

Various embodiments of the method according to the invention are possible, in which the phase error, due to the sampling frequency deviation, can be rendered negligible.

In a preferred embodiment of the method according to the invention the equalization step includes a step of division of the partial signal by a complex second signal which has the phase of the partial signal preceding in the sequence of the partial signals.

The above analysis affords the following for the phase shift of a symbol i:

$$\phi_i(k)=(m_0+i\cdot\xi)\cdot k+i\cdot c_0+\alpha_i \quad (5)$$

and the symbol i+1

$$\phi_{i+1}(k)=(m_0+(i+1)\cdot\xi)k+(i+1)\cdot c_0+\alpha_{i+1} \quad (6)$$

It will be seen that phase error $i\cdot\xi$ caused by the sampling error rises with an increasing ordinal number i in the sequence of the partial signals. The phases are subtracted by complex division. That therefore gives the following:

$$\phi_{i+1}(k)-\phi_i(k)=\xi\cdot k+c_0+(\alpha_{i+1}-\alpha_i) \quad (7)$$

The difference in the phase shifts is therefore not dependent on the ordinal number i. That means that the accumulation of the phase error, due to the sampling frequency, can be eliminated by means of division of the current complex signal by a second complex signal if that second complex signal contains the phase information of the preceding signal in the sequence.

The operation of ascertaining the second signal is the content of channel estimation. Preferably the second signal is the frequency response function of the associated subcarrier. The frequency response function of the subcarrier contains information about the attenuation and the phase shift of the subcarrier. In that way, in the equalization step, it is possible to effect a phase correction which makes it possible to substantially eliminate the phase error caused by erroneous estimation of the sampling frequency.

In this embodiment, there is preferably provided for each partial signal with the exception of the pilot partial signals a step of determining the frequency response function on the basis of a preceding partial signal in the sequence of the partial signals. The cyclically repeated operation of determining the frequency response function is based on the realization that the accumulation of the phase error due to the sampling frequency deviation, can be best prevented by determining the current phase shift on the channel. Basically it is also conceivable for the frequency response to be determined not for each partial signal but for example only for each second partial signal, and for an interpolated signal to be used in the meantime. In that way however the accumulation is not completely eliminated and the quality of phase correction is worsened. The consequence of this is that the error rate in decoding is increased.

The step of determining the frequency response function preferably includes a division of the preceding partial signal in the sequence by a third signal, wherein the third signal represents the equalized, phase-corrected and decoded and then recoded preceding partial signal in the sequence. The third signal thus represents the preceding partial signal cleared of all errors. After the division operation attenuation of the subcarrier can be inferred from the value of the quotient and the phase shift of the subcarrier can be inferred from the phase of the quotient. The phase shift can be determined by a procedure whereby the arc tan of the quotient of the imaginary part and the real part is subtracted from the phase of the quotient.

Preferably the method according to the invention provides 52 subcarriers. That corresponds to the number of subcarriers in the standards IEEE 802.11a) and Hiperlan/2.

In this respect there are preferably provided four pilot subcarriers also corresponding to the stated standards. If the numbering of the subcarriers: −26, −25, −24, . . . , −1, 1, 2, 3, . . . , 26 is followed, then the ordinal numbers −21, −7, 7 and 21 are associated with the pilot subcarriers in this embodiment.

In a particularly preferred embodiment of the invention the estimation step includes a step of calculating the following parameters on the basis of the pilot signals:

$$\cos(\phi_0)=(1/4)(\mathfrak{Re}\{P_{-21}\}+\mathfrak{Re}\{P_{-7}\}+\mathfrak{Re}\{P_{+7}\}+\mathfrak{Re}\{P_{+21}\}), \quad (8)$$

$$\sin(\phi_0)=(1/4)(\mathfrak{Im}\{P_{-21}\}+\mathfrak{Im}\{P_{-7}\}+\mathfrak{Im}\{P_{+7}\}+\mathfrak{Im}\{P_{+21}\}), \quad (9)$$

$$2\pi p_0\sin(\phi_0)\approx(2\mathfrak{Re}\{P_{-21}\}+3\mathfrak{Re}\{P_{-7}\}-3\mathfrak{Re}\{P_{+7}\}-2\mathfrak{Re}\{P_{+21}\})/128, \quad (10)$$

$$-2\pi p_0\cos(\phi_0)\approx(2\mathfrak{Im}\{P_{-21}\}+3\mathfrak{Im}\{P_{-7}\}-3\mathfrak{Im}\{P_{+7}\}-2\mathfrak{Im}\{P_{+21}\})/128, \quad (11)$$

Therein $P_{-21}$, $P_{-7}$, $P_{+7}$, $P_{+21}$ denote pilot signals and $\mathfrak{Re}$ and $\mathfrak{Im}$ denote the operation of determining the real and imaginary part respectively.

Calculation of those parameters is based on the following model:

The signal of the pilot channels can be represented as follows:

$$P_k=e^{j(2\pi p_0 k+\phi_0)}; j=\sqrt{-1} \quad (12)$$

Therein $p_0$ denotes the frequency offset of the sampling oscillator (sampling clock frequency offset) and is directly proportional to the above-discussed factor $\xi$. $\phi_o$ contains the common phase error due to phase noise and any residual error in the carrier frequency estimation. In equation (12) amplitude changes in the channel are disregarded. Only phase changes are taken into consideration.

On the basis of equation (12) once again to compare the solution according to the invention to the state of the art it is pointed out that, in the state of the art, the direct calculation of $\phi_0$ and $p_0$ is effected by resolving equation (12) in accordance with those parameters. That requires a high level of computing complication and expenditure, in particular arc tan calculation and correction by means of an NCO block. Both operations can be implemented in a CORDIC algorithm.

Under the condition:

$$2\pi k p_0 \ll 1 \quad (13)$$

$P_k$ can in a first approximation be approximated to the exponential function as follows:

$$P_k=\cos(\phi_0)-2\pi p_0 k\sin(\phi_0)+j(\sin(\phi_0)+2\pi p_0 k\cos(\phi_0)) \quad (14)$$

That affords the following for the pilot signals:

$$P_{-21}=\cos(\phi_0)+2\pi p_0 21 \sin(\phi_0)+j(\sin(\phi_0)-2\pi p_0 21 \cos(\phi_0)) \quad (15)$$

$$P_{-7}=\cos(\phi)+2\pi p_0 7 \sin(\phi_0)+j(\sin(\phi_0)-2\pi p_0 7 \cos(\phi_0)) \quad (16)$$

$$P_{+7}=\cos(\phi_0)-2\pi p_0 7 \sin(\phi_0)+j(\sin(\phi_0)+2\pi p_0 7 \cos(\phi_0)) \quad (17)$$

$$P_{+21}=\cos(\phi_0)-2\pi p_0 21 \sin(\phi_0)+j(\sin(\phi_0)+2\pi p_0 21 \cos(\phi_0)) \quad (18)$$

Accordingly the following four parameters have to be determined: $\cos(\phi_0)$, $\sin(\phi_0)$, $2\pi p_0 \sin(\phi_0)$, $2\pi p_0 \cos(\phi_0)$. That is effected for the first two parameters without multiplication solely on the basis of shift and adding operations in the following fashion:

$$\cos(\phi_0)=(\tfrac{1}{4})(\mathfrak{R}_e\{P_{-21}\}+\mathfrak{R}_e\{P_{-7}\}+\mathfrak{R}_e\{P_{+7}\}+\mathfrak{R}_e\{P_{+21}\}) \quad (19)$$

$$\sin(\phi_0)=(\tfrac{1}{4})(\mathfrak{I}_m\{P_{-21}\}+\mathfrak{I}_m\{P_{-7}\}+\mathfrak{I}_m\{P_{+7}\}+\mathfrak{I}_m\{P_{+21}\}) \quad (20)$$

A further approximation is introduced for the last two parameters, to avoid multiplication operations. Combining the real parts of the pilot signals firstly gives the following:

$$2\pi p_0 35 \sin(\phi_0)=(\tfrac{1}{2})(\mathfrak{R}_e\{P_{-21}\}+2\mathfrak{R}_e\{P_{-7}\}-2\mathfrak{R}_e\{P_{+7}\}-\mathfrak{R}_e\{P_{+21}\}) \quad (21)$$

$$2\pi p_0 28 \sin(\phi_0)=(\tfrac{1}{2})(\mathfrak{R}_e\{P_{-21}\}+\mathfrak{R}_e\{P_{-7}\}-\mathfrak{R}_e\{P_{+7}\}-\mathfrak{R}_e\{P_{+21}\}) \quad (22)$$

In equation (21) the number 35 is now approximated by the number 36. Using the following two reductions:

$$\frac{36}{32}=\left(\frac{32+4}{32}\right)=\left(1+\frac{1}{8}\right) \quad (23)$$

and $$\frac{28}{32}=\left(\frac{32-4}{32}\right)=\left(1-\frac{1}{8}\right) \quad (24)$$

that gives (25)

$$2\pi p_0 \sin(\phi_0)\frac{35}{32}+2\pi p_0 \sin(\phi_0)\frac{28}{32}\approx 2\pi p_0 \sin(\phi_0)\frac{36}{32}+2\pi p_0 \sin(\phi_0)\frac{28}{32}=$$

$$2\pi p_0 \sin(\phi_0)\cdot\left(1+\frac{1}{8}+1-\frac{1}{8}\right)$$

and finally $$2\pi p_0 \sin(\phi_0)\approx(2\mathfrak{R}_e\{P_{-21}\}+3\mathfrak{R}_e\{P_{-7}\}-3\mathfrak{R}_e\{P_{+7}\}-2\mathfrak{R}_e\{P_{+21}\})/128 \quad (26)$$

The exact value of the foregoing expression is $(126/128)\cdot 2\pi p_0 \sin(\phi_0)$. Accordingly the approximation involved gives rise to an error of about 1.6%.

The following is obtained in a similar manner:

$$-2\pi p_0 \cos(\phi_0)\approx(2\mathfrak{I}_m\{P_{-21}\}+3\mathfrak{I}_m\{P_{-7}\}-3\mathfrak{I}_m\{P_{+7}\}-2\mathfrak{I}_m\{P_{+21}\})/128 \quad (27)$$

Therefore, with an only slight error, the present embodiment makes it possible to totally avoid multiplication operations for determining the parameters.

In a further preferred method the estimation step includes a step of storing the parameters $2\pi p_0 \sin(\phi_0)$ and $(-2\pi p_0 \cos(\phi_0))$ in a respective first register.

In this embodiment of the invention the estimation step includes a first step of multiplying the respective content of the first register by a factor 26, that multiplication operation being carried out by means of a reduction $26=2^5-2^2-2$ in the form of shift and adding operations.

That method is based on the following correction algorithm:

After detection of the pilot signals, partial signals with useful data are detected. The first partial signal is identified by $D_{-26}$.

The phase component on the subcarrier in question, due to the residual phase error, can be represented as follows:

$$D_{-26}=\cos(\phi_0)+2\pi p_0 26 \sin(\phi_0)+j(\sin(\phi_0)-2\pi p_0 26 \cos(\phi_0)) \quad (28)$$

The required correction is accordingly $D^*_{-26}=\text{conj}\{D_{-26}\}$, wherein $\text{conj}\{.\}$ denotes the complexly conjugated partial signal. Two multiplications would be required in themselves in order to determine that phase correction factor in accordance with equation 28. By using the reduction $26=2^5-2^2-2$ however the multiplication operations can be replaced by shift and adding operations. Preferably the product calculated in that way is written into a second register.

In this embodiment, in a particularly preferred configuration, the phase correction factors of the following partial signals can also be determined without multiplication operations. In the case of a following partial signal the correction step, after the above-described step of "multiplication", includes a step of inverting the content of the first register, a step of adding the inverted content of the first register and the content of the second register, and a step of overwriting the second register with the calculated sum.

This is explained by the example of the correction factor $D^*_{-25}$. The following occur here:

$$\mathfrak{R}_e\{D^*_{-25}\}=\mathfrak{R}_e\{D^*_{-26}\}-2\pi p_0 \sin(\phi_0) \quad (29.a)$$

$$\mathfrak{I}_m\{D^*_{-25}\}=\mathfrak{I}_m\{D^*_{-26}\}-(-2\pi p_0 \cos(\phi_0)) \quad (29.b)$$

Accordingly $D^*_{-24}$ arises out of $D^*_{-25}$ and so forth. It is apparent that in this way the phase correction factors can be determined from the respectively preceding ones without an actual multiplication operation having to be performed.

Particular attention is required in this embodiment in respect of the phase correction factors which directly follow a pilot signal from the ordinal number: $D^*_{-20}$, $D^*_{-6}$, $D^*_{+1}$, $D^*_{+8}$ and $D^*_{+22}$. In those cases a "sampling hole" is given by a partial signal. Those phase correction factors are therefore determined as follows:

$$\mathfrak{R}_e\{D^*_{-20}\}=\mathfrak{R}_e\{D^*_{-22}\}-2\pi p_0 2 \sin(\phi_0) \quad (30.a)$$

$$\mathfrak{I}_m\{D^*_{-20}\}=\mathfrak{I}_m\{D^*_{-22}\}-(-2\pi p_0 2 \cos(\phi_0)) \quad (30.b)$$

$$\mathfrak{R}_e\{D^*_{-6}\}=\mathfrak{R}_e\{D^*_{-8}\}-2\pi p_0 2 \sin(\phi_0) \quad (30.c)$$

$$\mathfrak{I}_m\{D^*_{-6}\}=\mathfrak{I}_m\{D^*_{-8}\}-(-2\pi p_0 2 \cos(\phi_0)) \quad (30.d)$$

$$\mathfrak{R}_e\{D^*_{+1}\}=\mathfrak{R}_e\{D^*_{-1}\}-2\pi p_0 2 \sin(\phi_0) \quad (30.e)$$

$$\mathfrak{I}_m\{D^*_{+1}\}=\mathfrak{I}_m\{D^*_{-1}\}-(-2\pi p_0 2 \cos(\phi_0)) \quad (30.f)$$

$$\mathfrak{R}_e\{D^*_{+8}\}=\mathfrak{R}_e\{D^*_{+6}\}-2\pi p_0 2 \sin(\phi_0) \quad (30.g)$$

$$\mathfrak{I}_m\{D^*_{+8}\}=\mathfrak{I}_m\{D^*_{+6}\}-(-2\pi p_0 2 \cos(\phi_0)) \quad (30.h)$$

$$\mathfrak{R}_e\{D^*_{+22}\}=\mathfrak{R}_e\{D^*_{+20}\}-2\pi p_0 2 \sin(\phi_0) \quad (30.i)$$

$$\mathfrak{I}_m\{D^*_{+22}\}=\mathfrak{I}_m\{D^*_{+20}\}-(-2\pi p_0 2 \cos(\phi_0)) \quad (30.j)$$

In regard to the apparatus aspect the technical object of the invention is attained by a phase correction unit including a first signal input and a computing unit for determining a complex phase correction factor by means of arithmetic operations which include multiplication. According to the invention there is provided a second signal input to which the computing unit is connected, and in addition at least one multiplication operation is implemented in the form of at least one shift operator in conjunction with at least one adder.

In the case of the phase correction unit according to the invention, there is provided a second signal input for detecting pilot signals.

The phase correction unit according to the invention permits fast correction of the phase of a partial signal, as was described hereinbefore in connection with the method of the invention. In regard to the advantages of the apparatus therefore attention is expressly directed to the description of the method aspect of the invention.

Preferably all multiplication operations are implemented in the form of at least one shift operator in conjunction with at least one adder. Multiplication with an invariable factor is preferably implemented in the form of a reduction of the factor in powers of 2 of the kind $a_0 2^0 + a_1 2^1 + a_2 2^2 + \ldots$, with $a_0, a_1, a_2, \ldots = 1$ or $-1$. In that respect the example of multiplication with a factor 26 has been described hereinbefore.

The computing unit is preferably adapted to determine the parameters of equations 21, 22, 26 and 27 with the signals ($P_{-21}, P_{-7}, P_{+7}, P_{+21}$) received by way of the second signal input. In that case there is preferably provided a specific parameter calculation unit of suitable configuration, for determining each of the parameters.

The invention is described hereinafter by means of an embodiment by way of example. For that purpose reference is made to FIGS. 4 through 7 which are firstly briefly summarized jointly with above-described FIGS. 1 through 3. In the drawing.

Figure 4:
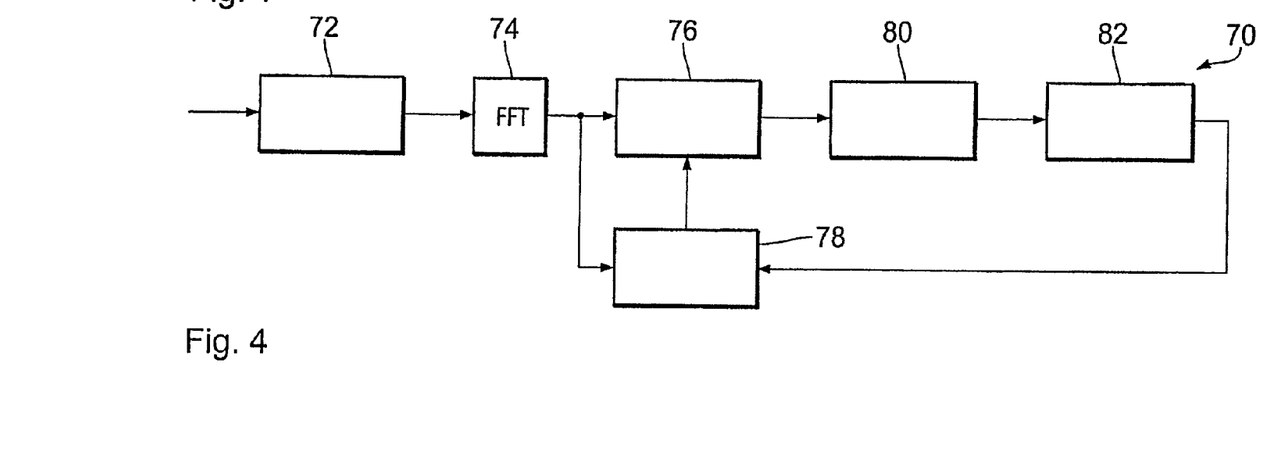
FIG. 4 shows a block diagram of an embodiment of an OFDM receiver.

FIG. 4 shows a block diagram of an embodiment by way of example of an OFDM receiver 70. The OFDM receiver 70 has a unit 72 for extracting cyclic prefix signals from the received signal. Connected on the output side thereof is an FFT block 74 which performs a fast Fourier transform. The output of the FFT block 74 is connected on the one hand to an equalization block 76 which is also referred to hereinafter as the equalizer. On the other hand the output of the FFT block 74 is connected to a channel estimation block 78 whose output is in turn taken to the equalizer 76.

The output of the equalizer is connected to a phase correction block 80 which in turn communicates with a block 82 for demapping and for forward error correction (FEC).

Figure 5:
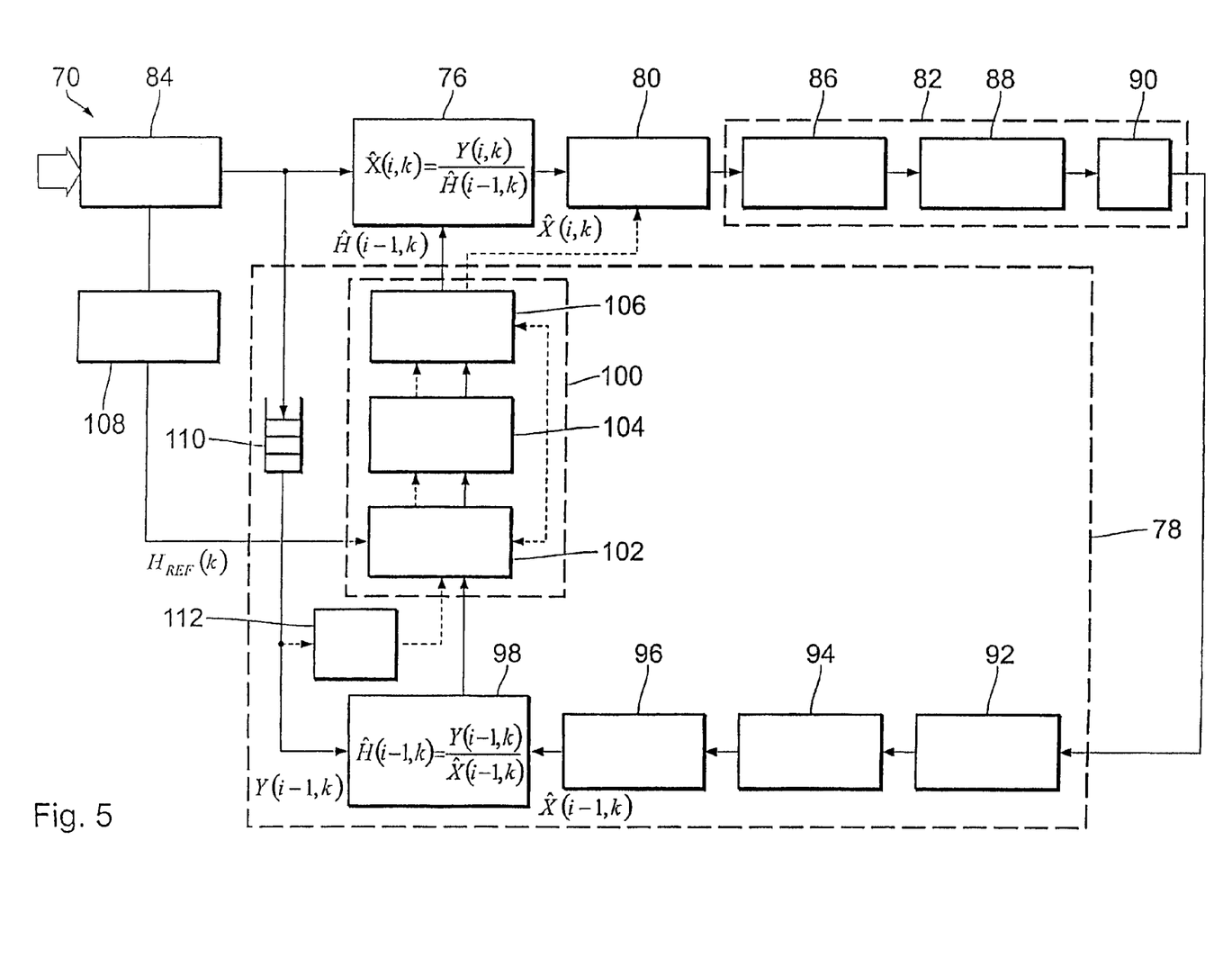
FIG. 5 shows a detailed block diagram of the OFDM receiver of FIG. 4.

FIG. 5 shows a detailed block diagram of the OFDM receiver 70. Fewer details than in FIG. 4 are shown only at the input of the OFDM receiver 70. Here the unit 72 is combined together with a synchronizer and the FFT block in a single block 84.

The block 82 in FIG. 4 includes per se known components: a soft demapper 82, a deinterleaver 88 and a soft Viterbi decoder 90. The output of the soft Viterbi decoder 90 is fed back to an encoder 92, on the output side of which are connected an interleaver 94 and a mapper 96.

A zero-forcing estimator 98 is connected to the mapper 96. Connected on the output side thereof is a buffer memory 100. The buffer memory 100 has a writing control 102, an S-RAM memory 104 and a reading control 106.

Provided between the output of the FFT block 74 and the writing control 102 is a first sign unit 108 for correcting the sign of reference signals. Also provided between the output of the FFT block and the zero-forcing estimator 98 is a buffer memory in order to produce a defined delay of data which are sent from the FFT block 74 to the zero-forcing estimator 98. Finally provided between the buffer memory 110 and the writing control 102 is a second sign unit 112 which sets the sign of pilot signals positive, independent of the sign with which they occur at the input.

The mode of operation of the OFDM receiver 70 is described in greater detail hereinafter. Firstly channel estimation in the block 78 is described in greater detail. In this case, the standards IEEE 802.11a and Hiperlan/2 form the basis in terms of the structure of the received signals.

The first symbol received from the synchronizer 84 is the reference symbol $H_{REF}(k)$. The reference symbol is derived from the long preamble symbols. That symbol is used by the receiver as a reference because the data communicated therein are known to the receiver from outset.

The reference symbol $H_{REF}(k)$ is then stored in the buffer memory 100. In that respect k denotes the subcarrier frequency with the following values (in this order:) k=−21, −7, +7, +21, −26, 25, ..., 22, −20, −19, ... −9, −8, −6, −5, ..., −1, +1, ..., +5, +6, +8, +9, ..., +19, +20, +22, ..., +25, +26. The order of the subcarriers is produced in the FFT block 74. In all accordingly 52 signals are stored.

The first symbol after the reference symbol, the so-called SIGNAL symbol, is then corrected by the equalizer 76. The equalizer 76 calculates the quotient of the SIGNAL symbol and the symbol stored in the buffer memory 100.

The symbol equalized by the equalizer 76 is then subjected to phase correction in the phase correction block 80, completely demodulated and finally decoded.

The bits which are decoded from the SIGNAL symbol in the Viterbi decoder 90 provide information about the rate and the number of bytes which are received in the current frame. The SIGNAL symbol is not read into the feedback loop beginning with the encoder 92.

The first DATA symbol (symbol #1) which is received after the SIGNAL symbol is then corrected again in the equalizer 76 with the channel estimation contained in the buffer memory 100.

The symbol outputted by the equalizer is phase-corrected, demodulated and then decoded. The bits at the output of the Viterbi decoder, which correspond to the symbol #1 are fed back into the channel estimation block 78.

In the channel estimation block 78 the bits are firstly recoded and then modulated. The complex signals X(i−1,k) obtained are compared to the complex signals which were present for the same symbol at the stage prior to equalization in the equalizer. This comparison involves a division operation. That form of channel estimation therefore represents a zero-forcing estimation. That channel estimation is stored in the buffer memory 100.

The above-specified division is performed for 48 partial signals, namely those which correspond to k=−26, −25, ..., −22, −20, −19, ..., −9, −8, −6, −5, ..., −1, +1, ..., +5, +6, +8, +9, . . . , +19, +20, +22, . . . , +25, +26. The partial signals for k=−21, −7, +7 and +21 (pilot signals) are stored directly in the buffer memory 100 after sign correction in the block 112.

The channel estimation obtained in that way acquires the information about the residual phase error because the data in the feedback branch do not have any phase error at all.

The next received symbol is treated precisely like the preceding one, beginning with equalization in the equalizer 76.

Figure 6:
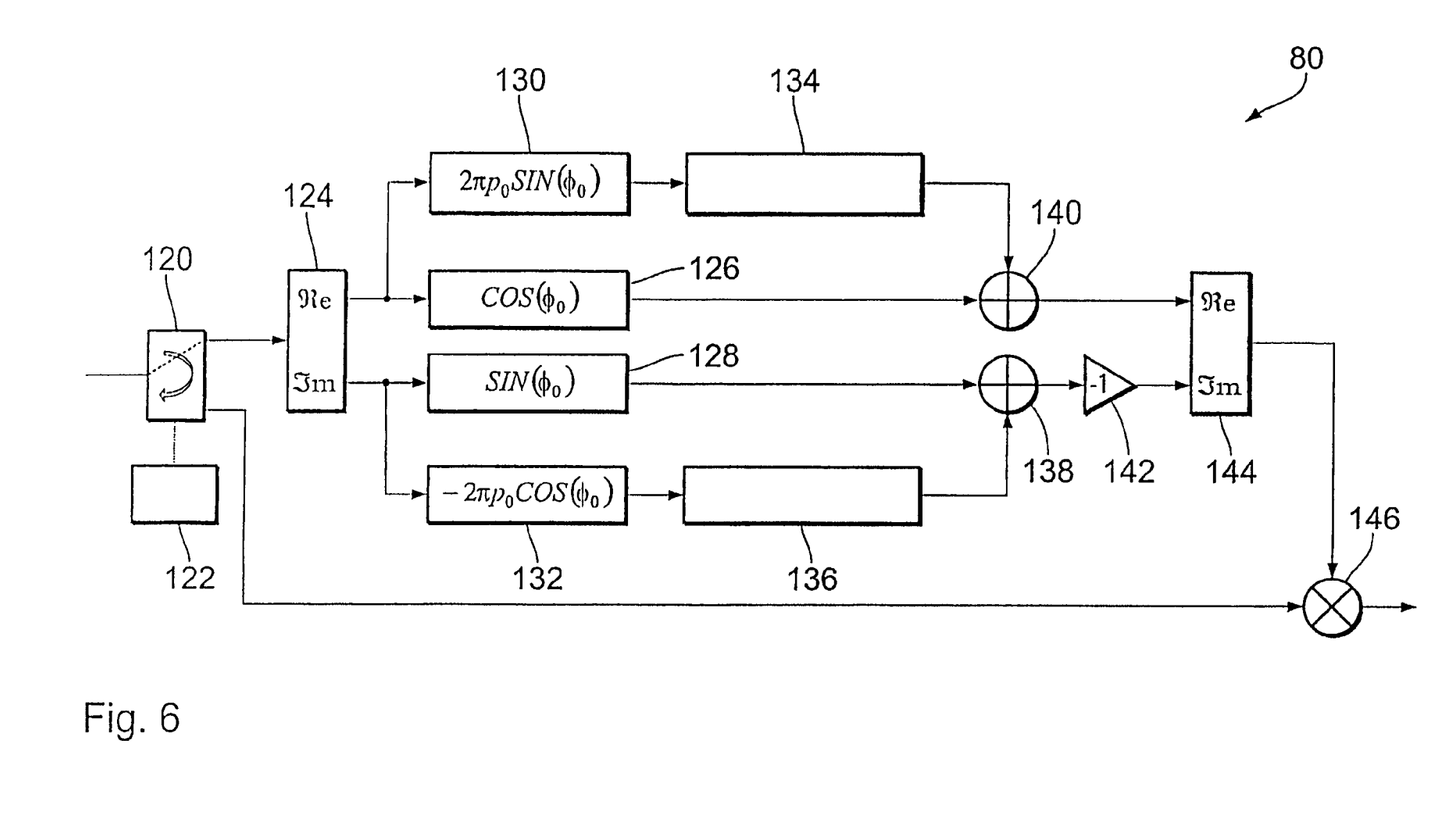
FIG. 6 shows a detailed block diagram of the phase correction unit of FIG. 5.

Reference is now made to FIG. 6 to describe in greater detail phase correction in the phase correction block 80. For that purpose the structure of the phase correction block 80 will firstly be described.

At the input side the phase correction block 80 has a switch 120 controlled by a switch control 122. The position of the switch, which is the "upper" position in FIG. 6, provides for a conducting connection to a unit 124 which forwards the real and the imaginary parts of the inputted signal separately into two parallel processing branches which are described hereinafter.

The real part is passed to two parameter circuits 126 and 130. The first parameter circuit 126 determines the parameter $\cos \Phi_0$ in accordance with equation 8. The second parameter circuit 130 determines the parameter in accordance with $2\pi p_0 \sin \Phi_0$ in accordance with equation 10. The imaginary part is passed in parallel to a third and a fourth parameter circuit 128 and 132 respectively. The third parameter circuit determines the parameter $\sin \Phi_0$ in accordance with equation 9. The fourth parameter circuit 132 determines the parameter $-2\pi p_0 \sin \Phi_0$.

A respective accumulator 134 and 136 is connected on the output side of the second and fourth parameter circuits 130 and 132. The structure and function of the two accumulators which are of an identical design are described hereinafter with reference to FIG. 7.

The outputs of the third parameter circuit 128 and of the accumulator 136 are fed to an adder 138. The outputs of the first parameter circuit 126 and the accumulator 134 are fed to an adder 140.

The output of the adder 138 is connected by way of an inverter 142 to an imaginary part input of a circuit 144 whose real part input is connected to the output of the adder 140. The inverter 142 inverts the sign of the output signal of the adder 138. The circuit 144 converts the signals at the two inputs into a complex signal which, like the signal at the second output of the switch 120, is passed to a complex multiplier 146.

Figure 7:
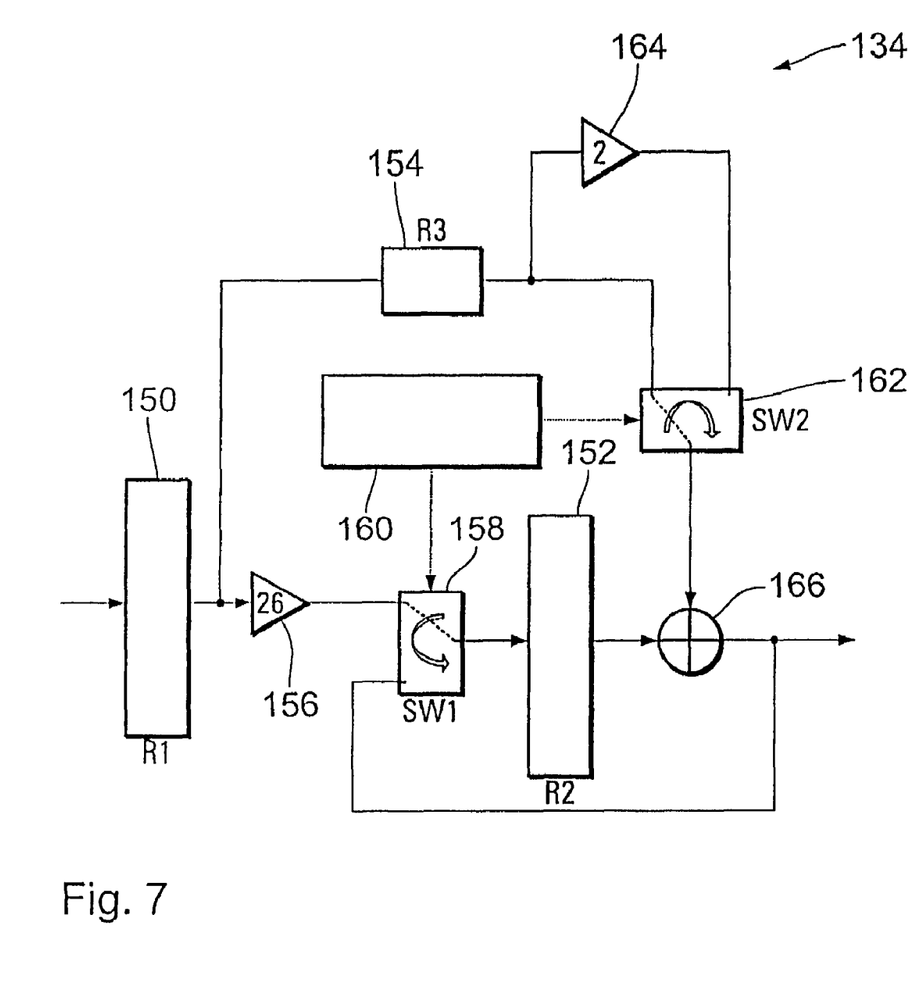
FIG. 7 shows a detailed block diagram of the accumulator of FIG. 6.

The structure of the accumulators 134 and 136 is described hereinafter with reference to FIG. 7. FIG. 7 admittedly relates to the accumulator 134 but the accumulator 136 is of the same structure.

The accumulator 134 has a first register 150 into which signals are written from the parameter circuit 130. The output of the register 150 is passed in parallel on the one hand to a factor circuit 156 and on the other hand to a second register 154. The factor circuit 156 multiplies the output signal of the first register by 26. That is effected solely by means of shift and adding operations on the basis of the above-indicated reduction of the number 26 into powers of the number 2. The output of the factor circuit 156 is connected to a third register 152 by way of a first input of a switch 158 controlled by a control circuit 160.

The output of the second register 154 is passed in parallel to two inputs of a switch 162, in which case however one of the two parallel branches is passed by way of a factor circuit 164 which by means of a shift operation effects multiplication of the register output signal by 2. The output of the switch 162 and the output of the register 152 are connected to the inputs of an adder 166.

The circuit in FIG. 6 calculates for a respective signal the phase correction factor, as for example corresponding to equations 29.a and 29.b. The subtraction operation required for the respective symbol is effected by means of the accumulator 166. As discussed above the value to be subtracted is dependent on the ordinal number of the symbol to be corrected.

The circuit, by suitable control of the switches in the accumulator circuit in FIG. 7, also permits calculation of the "special cases" corresponding to equations 30.a through 30.j.

That circuit affords a particularly simple structure for a phase correction circuit which causes a particularly slight delay.

The invention claimed is:

1. A method of reducing a phase error caused by a plurality of error sources in a signal which is present in a digital frequency representation in the form of a sequence of a plurality of digital partial signals which are associated with a number of subcarriers (k) of a carrier, comprising, for each partial signal, the steps of:

equalization of the partial signal (Y(i,k)),
   estimation of the phase error of the equalized partial signal (X(i,k)), and
   correction of the estimated phase error of the equalized partial signal, characterized in that:
   the equalization step includes a step of at least partially eliminating an accumulation of a phase error of the partial signal, caused by a sampling frequency error, over the sequence of the partial signals, such that the accumulation is negligible,
   the estimation step includes a step of detecting a plurality of predetermined pilot signals and a step of determining a phase correction factor on the basis of the detected pilot signals, wherein at least one multiplication operation is carried out solely by means of shift and adding operations,
   the equalization step includes a step of division of the partial signal by a complex second signal which has the phase of the partial signal preceding in the sequence of the partial signals, wherein the second signal represents a frequency response function of the associated subcarrier for the preceding partial signal in the sequence of partial signals,
   the method further includes a step, effected for each partial signal with the exception of the pilot partial signals, of determining the frequency response function on the basis of a preceding partial signal in the sequence of partial signals, and
   the step of determining the frequency response function includes a division of the preceding partial signal in the sequence by a third signal, wherein the third signal represents the equalized, phase-corrected and decoded and then recoded preceding partial signal.

2. A method as set forth in claim 1 characterized in that there are provided 52 subcarriers.

3. A method as set forth in claim 2 characterized in that there are provided four pilot subcarriers for the transmission of pilot signals with which the ordinal numbers −21, −7, 7 and 21 are associated with the following numbering of the subcarriers: −26, −25, −24, . . . , −1, 1, 2, 3, . . . , 26.

4. A method as set forth in claim 3 characterized in that the pilot signals are present at the beginning of the sequence of partial signals.

5. A method as set forth in claim 4 characterized in that the phase correction factor is determined utilizing the pilot partial signals without a multiplication operation.

6. A method of reducing a phase error caused by a plurality of error sources in a signal which is present in a digital frequency representation in the form of a sequence of a plurality of digital partial signals which are associated with a number of subcarriers (k) of a carrier, comprising, for each partial signal, the steps of:
   equalization of the partial signal (Y(i,k)),
   estimation of the phase error of the equalized partial signal (X(i,k)), and
   correction of the estimated phase error of the equalized partial signal,
   characterized in that:
   the equalization step includes a step of at least partially eliminating an accumulation of a phase error of the partial signal, caused by a sampling frequency error, over the sequence of the partial signals, such that the accumulation is negligible,
   the estimation step includes a step of detecting a plurality of predetermined pilot signals and a step of determining a phase correction factor on the basis of the detected pilot signals, wherein at least one multiplication operation is carried out solely by means of shift and adding operations,
   the correction step includes a step of complex multiplication of the equalized partial signal with the phase correction factor, and
   that the estimation step includes a step of calculating the following parameters on the basis of the pilot signals:

$$\cos(\phi_0) = (1/4)(\Re e\{P_{-21}\} + \Re e\{P_{-7}\} + \Re e\{P_{+7}\} + \Re e\{P_{+21}\}),$$

$$\sin(\phi_0) = (1/4)(\Im m\{P_{-21}\} + \Im m\{P_{-7}\} + \Im m\{P_{+7}\} + \Im m\{P_{+21}\}),$$

$$2\pi p_0 \sin(\phi_0) \approx (2\Re e\{P_{-21}\} + 3\Re e\{P_{-7}\} - 3\Re e\{P_{+7}\} - 2\Re e\{P_{+21}\})/128,$$

$$-2\pi p_0 \cos(\phi_0) \approx (2\Im m\{P_{-21}\} + 3\Im m\{P_{-7}\} - 3\Im m\{P_{+7}\} - 2\Im m\{P_{+21}\})/128,$$

wherein $P_{-21}$, $P_{-7}$, $P_{+7}$, $P_{+21}$ denote pilot signals and $\Re e$ and $\Im m$ denote the operation of determining the real and imaginary part respectively.

7. A method as set forth in claim 6 characterized in that the estimation step includes a step of storing the parameters $2\pi p_0 \sin(\phi_0)$ and $-2\pi p_0 \cos(\phi_0)$ in a respective first register.

8. A method as set forth in claim 7 characterized in that the estimation step includes a first step of multiplying the respective content of the first register by a factor 26, wherein said multiplication operation is effected by means of a reduction $26 = 2^5 - 2^2 - 2$ in the form of shift and adding operations.

9. A method as set forth in claim 8 characterized in that the calculated product is written into a second register.

10. A method as set forth in claim 9 characterized in that in the case of a subsequent partial signal the correction step after the multiplication step includes a step of inverting the content of the first register, a step of adding the inverted content of the first register and the content of the second register, and a step of overwriting the second register with the calculated sum.

11. A phase correction unit including a first signal input and a computing unit for determining a complex phase correction factor by means of arithmetic operations which include multiplication, wherein there is provided a second signal input to which the computing unit is connected, and at least one multiplication operation is implemented in the form of at least one shift operator in conjunction with at least one adder, characterized in that
   multiplication with an invariable factor is implemented in the form of a reduction of the factor in powers of 2 of the kind $a_0 2^0 + a_1 2^2 + a_2 2^2 + \ldots$, with $a_0, a_1, a_2, \ldots = 1$ or $-1$.

12. A phase correction unit as set forth in claim 11 characterized in that all multiplication operations are implemented in the form of at least one shift operator in conjunction with at least one adder.

13. A phase correction unit including a first signal input and a computing unit for determining a complex phase correction factor by means of arithmetic operations which include multiplication, wherein there is provided a second signal input to which the computing unit is connected, and at least one multiplication operation is implemented in the form of at least one shift operator in conjunction with at least one adder
   characterized in that the computing unit is adapted to determine the following parameters with the signals ($P_{-21}$, $P_{-7}$, $P_{+7}$, $P_{+21}$) received by way of the second signal input:

$$\cos(\phi_0) = (1/4)(\Re e\{P_{-21}\} + \Re e\{P_{-7}\} + \Re e\{P_{+7}\} + \Re e\{P_{+21}\}),$$

$$\sin(\phi_0) = (1/4)(\Im m\{P_{-21}\} + \Im m\{P_{-7}\} + \Im m\{P_{+7}\} + \Im m\{P_{+21}\}),$$

$$2\pi p_0 \sin(\phi_0) \approx (2\Re e\{P_{-21}\} + 3\Re e\{P_{-7}\} - 3\Re e\{P_{+7}\} - 2\Re e\{P_{+21}\})/128,$$

$$-2\pi p_0 \cos(\phi_0) \approx (2\Im m\{P_{-21}\} + 3\Im m\{P_{-7}\} - 3\Im m\{P_{+7}\} - 2\Im m\{P_{+21}\})/128,$$

wherein $P_{-21}$, $P_{-7}$, $P_{+7}$, $P_{+21}$ denote pilot signals and $\Re e$ and $\Im m$ denote the operation of determining the real and imaginary part respectively.

14. A phase correction unit as set forth in claim 13 characterized in that for determining each of the parameters there is provided a specific parameter calculation circuit of corresponding configuration.

15. A device for reducing a phase error caused by a plurality of error sources in a signal which is present in a digital frequency representation in the form of a sequence of a plurality of digital partial signals which are associated with a number of subcarriers (k) of a carrier, comprising
   an equalization unit configured for equalizing each partner signal,
   an estimation unit configured to estimate the phase error of the equalized partial signal, and
   a phase correction unit configured to correct the estimated phase error of the equalized partial signal, wherein:
   the equalization unit is configured to at least partially eliminate an accumulation of a phase error of the partial signal, caused by a sampling frequency error, over the sequence of the partial signals, such that the accumulation is negligible,
   the equalization unit is configured to divide the partial signal by a complex second signal which has the phase of the partial signal preceding in the sequence of the partial signals, wherein the second signal represents a frequency response function of the associated subcarrier for the preceding partial signal in the sequence of partial signals
   the estimation unit is configured to perform, as part of the estimation of the phase error of the equalized partial signal, a detection of a plurality of predetermined pilot signals and determination of a phase correction factor on the basis of the detected pilot signals, wherein at least one multiplication operation is carried out solely by means of shift and adding operations, and the estimation unit is configured to determine, for each partial signal with the exception of the pilot partial signals, the frequency response function on the basis of a preceding partial signal in the sequence of partial signals, wherein the determining of the frequency response function includes a division of the preceding partial signal in the sequence by a third signal, wherein the third signal represents the equalized, phase-corrected and decoded and then recoded preceding partial signal.

* * * * *

UNITED STATES PATENT AND TRADEMARK OFFICE
CERTIFICATE OF CORRECTION

PATENT NO. : 7,583,770 B2
APPLICATION NO. : 10/530595
DATED : September 1, 2009
INVENTOR(S) : Alfonso Troya, Milos Krstic and Koushik Maharatna

It is certified that error appears in the above-identified patent and that said Letters Patent is hereby corrected as shown below:

In column 16, line 6, which is claim 11, line 11, "$a_1 2^2$" should be --$a_1 2^1$--.

In column 16, line 20, which is claim 13, line 10, "$R_{-7}$" should be --$P_{-7}$--.

Signed and Sealed this

Tenth Day of November, 2009

David J. Kappos
*Director of the United States Patent and Trademark Office*